(No Model.) 3 Sheets—Sheet 1.
W. A. LORENZ & W. H. HONISS.
PAPER BAG MACHINE.
No. 331,723. Patented Dec. 1, 1885.
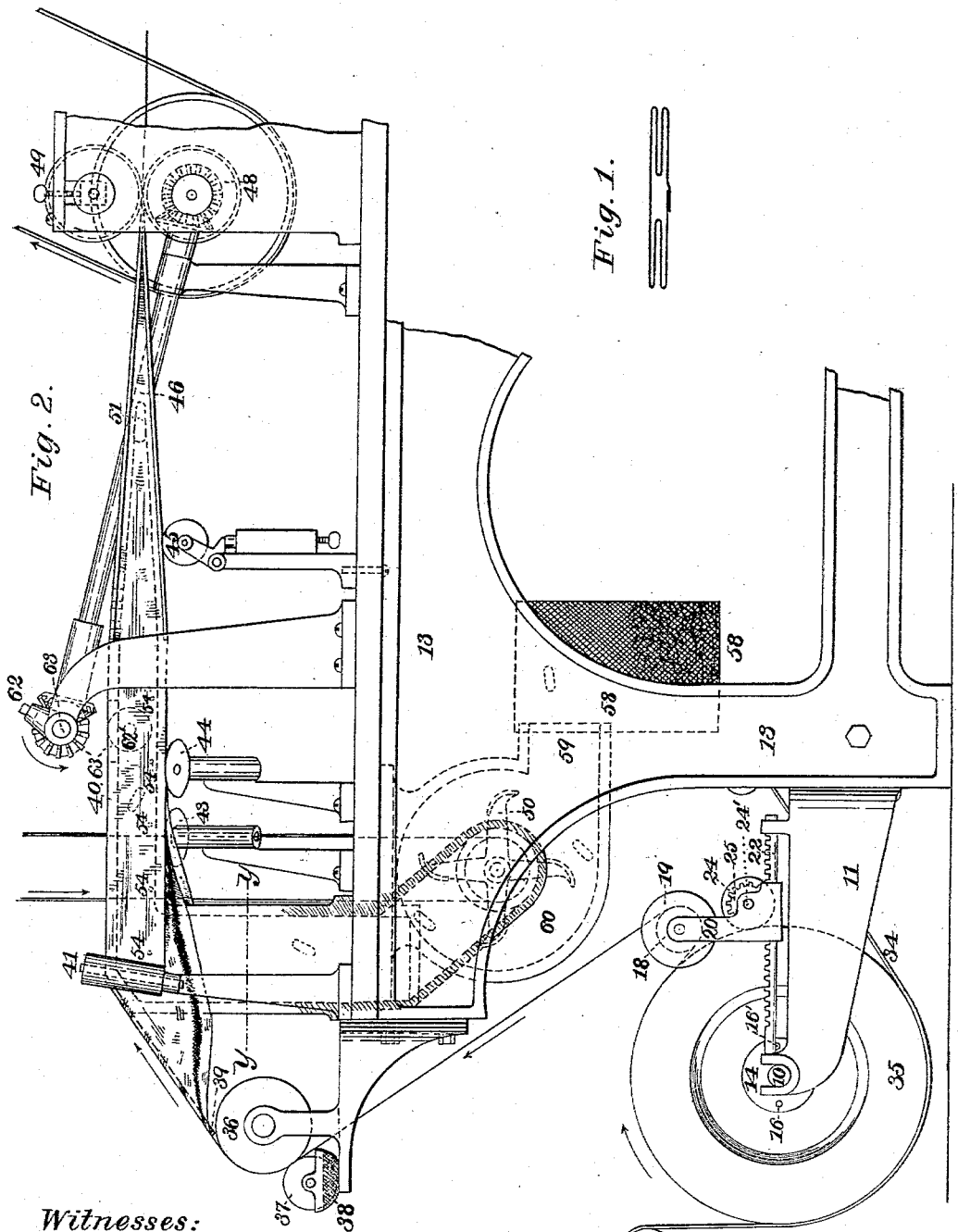
Witnesses:
Chas. P. Watson
Wm. Waldo Hyde.
Inventors:
William A. Lorenz
William H. Honiss.
By Albert H. Walker Attorney.

(No Model.) 3 Sheets—Sheet 2.
W. A. LORENZ & W. H. HONISS.
PAPER BAG MACHINE.
No. 331,723. Patented Dec. 1, 1885.
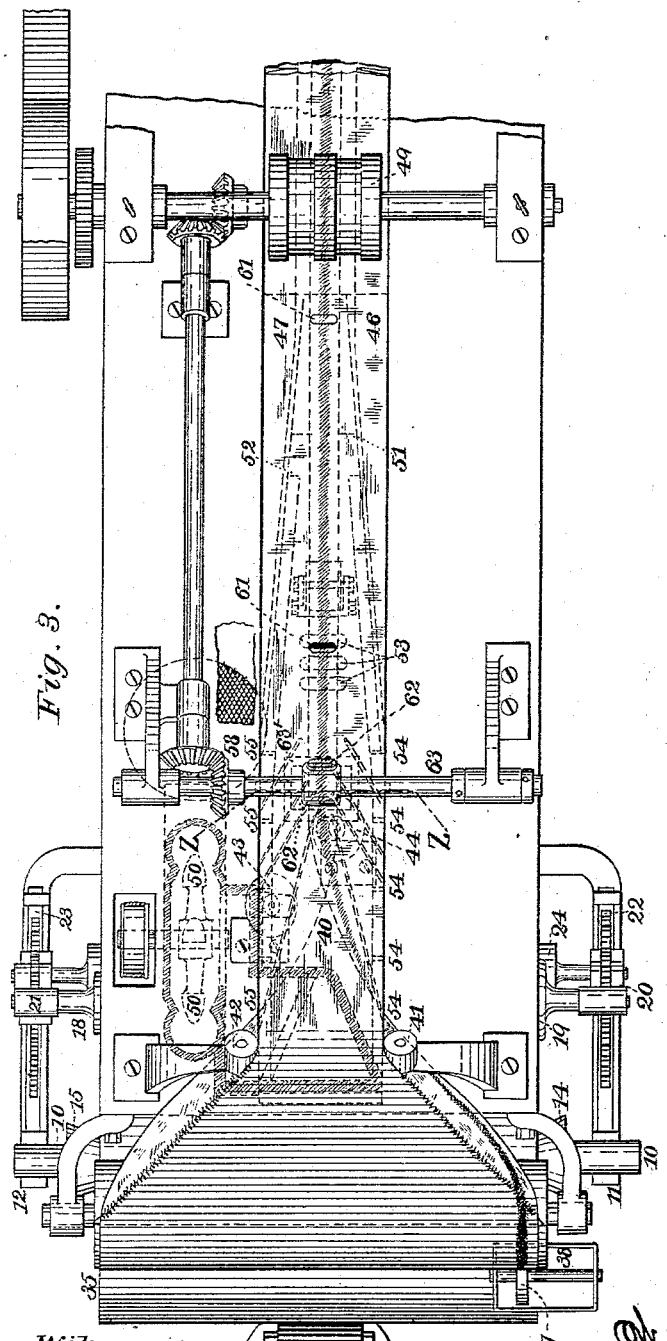
Witnesses:
C. P. Watson
N. W. Hyde.
Inventors:
William A. Lorenz
William H. Honiss
By Albert H. Walker Attorney.

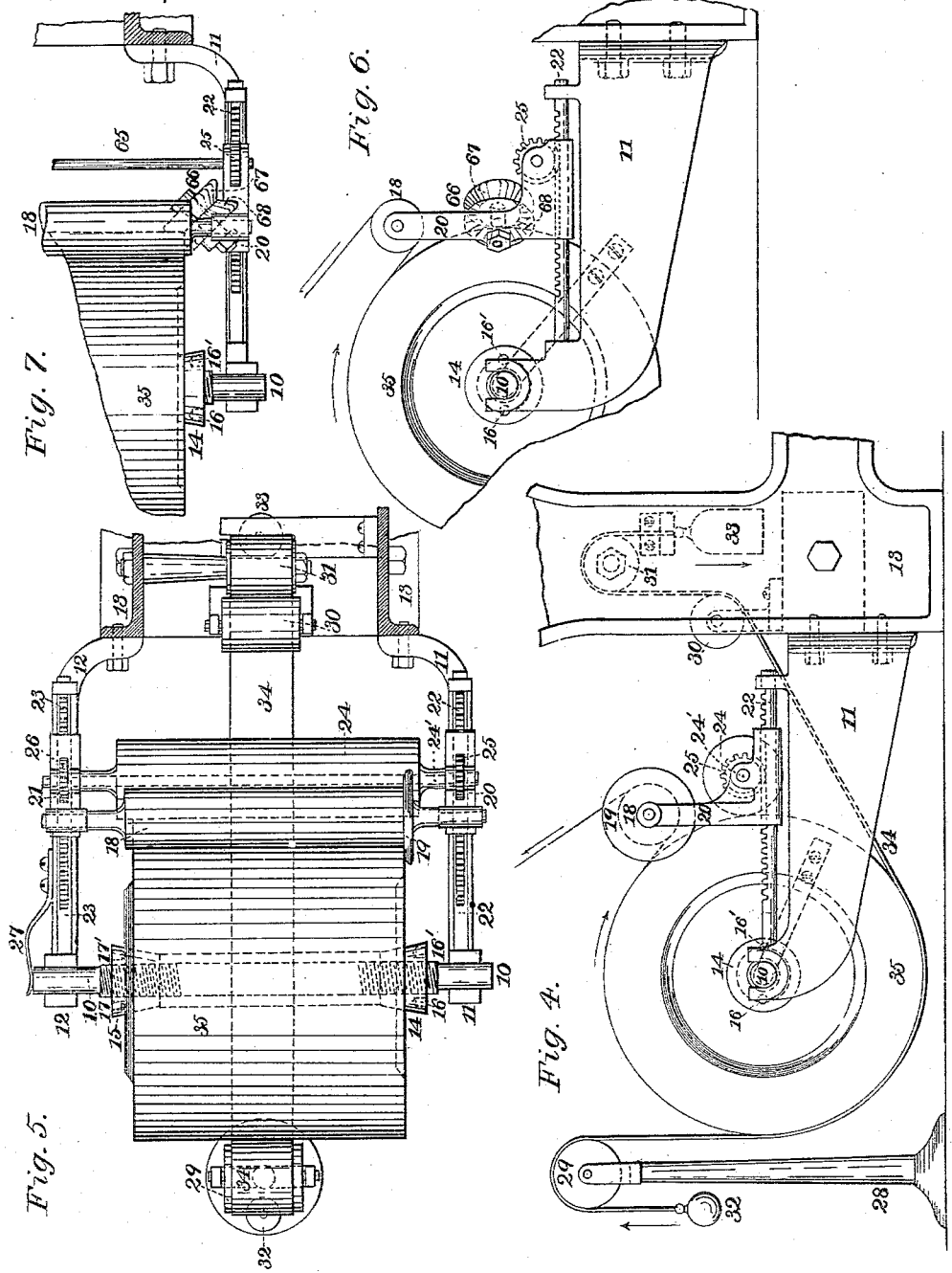

UNITED STATES PATENT OFFICE.

WILLIAM A. LORENZ AND WILLIAM H. HONISS, OF HARTFORD, CONNECTICUT, ASSIGNORS TO FELIX W. LEINBACH AND CLARENCE A. WOLLE, BOTH OF BETHLEHEM, PENNSYLVANIA.

PAPER-BAG MACHINE.

SPECIFICATION forming part of Letters Patent No. 331,723, dated December 1, 1885.

Application filed June 16, 1884. Serial No. 134,990. (No model.)

*To all whom it may concern:*

Be it known that we, WILLIAM A. LORENZ and WILLIAM H. HONISS, both of Hartford, Connecticut, have invented certain new and useful Improvements in Paper-Bag Machines, of which the following description and claims constitute the specification, and which is illustrated by the accompanying three sheets of drawings.

In many respects this apparatus is identical with that shown on Sheet 1 of the drawings of our application of July 16, 1883, for Letters Patent of the United States for improvements in paper-bag machines, and in some of the same respects and in some other respects it is identical with that shown on Sheets 3 and 4 of our application of May 15, 1884, for Letters Patent of the United States for a new and useful paper-bag machine; but in several particulars it is substantially different from both. The function of this apparatus is the same as that of the two others mentioned in this paragraph—namely, to automatically manufacture certain tucked paper tubing continuously from a continuous roll of paper.

Figure 1 of the drawings is a cross-section of the tucked paper tubing. Fig. 2 is a side elevation of the present apparatus. Fig. 3 is a plan view of the same. Fig. 4 is a detail view of the centralizing apparatus. Fig. 5 is a plan view of the same. Fig. 6 is a detail view of a modified form of the centralizing device. Fig. 7 is a plan of those modified features. Fig. 8 is a view of a portion of the bottom side of the former, the triangular cross-section of that view being on the line Y Y of Fig. 2. Fig. 9 is a cross-section of the former on the line Z Z of Figs. 3 and 8.

A shaft, 10, revolves in open bearings in brackets 11 and 12, which brackets are bolted to the frame 13. Two hollow truncated cones, 14 and 15, are fitted to screw-threads on the shaft 10. These cones are adjusted on the shaft by means of spanner-wrenches, (a specimen of which sort of wrench is shown in Figs. 11 and 12 of our said application of May 15, 1884,) the pins of which wrenches enter holes 16 16' and 17 17' in the bases of the cones 14 and 15, respectively. A roller, 18, provided with a fixed flange, 19, revolves in two bearings in two sliding carriages, 20 and 21, respectively. These carriages slide upon the rack-shafts 22 and 23, respectively, which rack-shafts are fixed to the brackets 11 and 12, respectively. A roller, 24, revolves on the shaft 24', which shaft revolves in bearings in the sliding carriages 20 and 21. Upon the ends of that shaft are keyed the pinions 25 and 26, which pinions engage with the racks 22 and 23, respectively. A spring, 27, is fastened at its base to the side of the bracket 12. The free end of the spring presses against one end of the shaft 10, for a purpose hereinafter explained. A standard, 28, supports a pulley, 29, to the left of the middle of the roller 10. The pulleys 30 and 31 are mounted to the right of the roller 24 and midway of its length, and midway between the two sides of the frame 13. The weights 32 and 33 are supported from the ends of the broad strap 34, which strap passes over and is supported by the pulleys 29 and 31, and passes under the pulley 30 and under the roll of paper 35. Such a roll of paper is placed upon the shaft 10 by removing that shaft from its bearings, and by removing one of the truncated cones from that shaft, and by inserting that shaft through the roll of paper, and then by replacing the removed truncated cone, screwing this cone tightly into the cylindrical hole through the axis of the roll of paper until the roll of paper is rigidly held upon the shaft between the two truncated cones. The roll of paper, with the shaft 10, is then lifted into the bearings of that shaft in the brackets 11 and 12, in such a position that the free end of the paper will extend in the direction shown by the curved arrow in Fig. 4. The free end of the paper is then carried around the roll 18, and thence around the guide-roll 36, and between that roll and the paste-roll 37, which latter is supplied with paste by the dish 38. The free end of the paper passes from the guide-roll 36 to the inclined apron 39, and thence to the former 40, being guided thereon by the two corner rollers, 41 and 42. The two edges of the paper are led under the former by the rolls 43 and 44, and the unpasted border of the paper is laid upon the pasted border by the roll 43, which is a duplicate of the roller 44, but is set on an opposite angle of substantially the same degree. The lap of the two edges of the paper is pressed together by the roller 45, and the paper tube, thus formed, is reduced to the tucked shape shown, Fig. 1, by means of the tuck-recesses 46 and 47 and drawing-rolls 48 and 49, in the same general manner as by the corresponding parts of the apparatus shown in our said application of July 16, 1883. Air is drawn from the interior of the former 40 by means of the fan 50, as in the apparatus shown in that application. The former 40 also has the openings 51 and 52, between the interior of the former and the tuck-recesses 46 and 47, respectively, as the former shown in that application also has; but this former 40 has in addition one or more openings, 53, from the interior of the former through the upper wall thereof, and also has a series of openings, 54 and 55, from the interior of the rectangular part of the former through its two side walls, respectively, and also has a series of openings, 56 and 57, from the interior of the former through its bottom wall on the two sides, respectively, of a longitudinal line drawn across the center of that bottom. Each opening of each of the series 56 and 57 communicates with one of the series of grooves 58 and 59, respectively, all of which grooves are cut on the outer surface of the bottom wall of the former, and extend diagonally backward from the openings with which they respectively communicate to the adjacent edge of that surface. A wire basket, 58, is suspended between the two sides of the frame 13, adjacent to the opening 59 of the fan-box 60. The fan 50 is driven as shown in our said application of July 16, 1883, or in any other proper manner. A series of holes, 61, are cut through the longitudinal center of the upper wall of the paper tube by means of the knife 62, driven with a rotary motion by the shaft 63, and other mechanism, as shown in Figs. 2 and 3, and as shown and described in our said application of May 15, 1884.

The modification shown in Figs. 6 and 7 of the centralizing apparatus consists in omitting the flange 19 of the roller 18, and also in omitting the roller 24 and in mounting upon the sliding carriage 20, below the roller 18, the grooved roller 66. This grooved roller revolves upon a horizontal axis, which, instead of being parallel with the axis of the shafts 10 and 65, is placed on an angle of forty-five degrees from the direction of those axes. The sides of the grooves in the periphery of the roller 66 converge together, meeting at a right angle midway of the width of that periphery. The side 67 of the groove of the roller 66 presses against the border of the periphery of the roll of paper, while the side 68 of the groove of the roller 66 presses against the border of one end of the roll of paper.

The mode of operation of this apparatus is as follows: The drawing-rolls 48 and 49 pull the tucked tube continuously to the right, as shown in Fig. 2, thus continuously unrolling the paper from the roll of paper 35. As that paper unrolls, the diameter of the roll lessens, and as it lessens the border of its end adjacent to the flange 19 is, by the action of the spring 27, kept constantly in contact with that flange. Thus that portion of the paper which is delivered from the roll has its central longitudinal line always on a line with the center of the apron 39 and the center of the former 40, even if the roll of paper has been telescoped in handling or otherwise, as shown in Fig. 5. As the diameter of the roll of paper diminishes, the roll 24 follows its receding periphery and, as it follows, carries the sliding carriage 20 and 21, and with them the roller 18, evenly toward the axis of the roll of paper. Thus the flange 19 is kept constantly in contact with the border of the adjacent end of the paper roll.

When the modified devices shown in Figs. 6 and 7 are used, the side 68 of the grooved roller 66 performs the function otherwise performed by the flange 19, and the side 67 of the roller 66 performs the function otherwise performed by the periphery of the roller 24, and the shaft 65 performs the function otherwise performed by the shaft 24'—namely, the work of causing the two sliding carriages to advance to the receding periphery of the paper roll with equal pace.

The strap 34 applies friction to the periphery of the paper roll, and thus prevents its unwinding too rapidly. As the paper roll always revolves in the direction of the curved arrow in Fig. 4, it tends to pull the strap 34 in the same direction, and that tendency somewhat neutralizes the difference in the gravity between the weights 32 and 33. As the diameter of the paper roll diminishes, the friction exerted by the strap 34 lessens, because the pull of the strap between the pulleys 29 and 30 becomes constantly more direct, and therefore constantly less powerful, in the direction of the radius of the curve of that strap. Thus the pulleys 29, 30, and 31, the weights 32 and 33, and the strap 34 constitute an automatically-varying tension-regulator of the paper roll 35. If the drawing-rolls 48 and 49 stop before the paper roll is entirely unwound, the weight 33, being heavier than the weight 32, pulls the strap 34 in its direction, and thus causes the roll of paper 35 to revolve backward until it has taken up whatever slack may have been unwound by its inertia, causing it to revolve forward after the stopping of the drawing-rolls. As the paper is drawn over the rectangular part of the former 40, it proceeds toward the drawing-rolls 48 and 49 in the same form as shown in our said application of July 16, 1883; but instead of being caused to fold around the rectangular part of the former by means of rollers alone, as in that application, it is partly caused to do so by means of atmospheric pressure against the outside of the paper tube being formed, which atmospheric pressure is brought into operation by means of the series of openings 54, 55, 56, and 57 and the series of grooves 58 and 59, all of which communicate with the interior of the former 40, from which interior air is being constantly drawn by the fan 50.

As the knife 62 revolves, it cuts a series of holes, 61, through the upper wall of the paper tube at intervals corresponding to the length of tube required to make a single paper bag. This cutting creates a chip of paper for each hole cut, and that chip is carried by the rubber roller 62', through the opening 63', into the interior of the former; or, otherwise, it is carried along with the paper tube until it reaches the opening or openings 53, when it is forced by atmospheric pressure into the interior of the former, and thence into the fan-box 60, and is blown by the fan from that box into the basket 58. That basket being closed, except at the place of its communication with the fan-box, securely holds the paper chips until it is filled with them, when it may be removed, emptied, and replaced.

We claim as our joint invention—

1. The combination of the shaft 10, the truncated cones 14 and 15, the grooved roller 66, and the spring 27, all operating together, substantially as described, to keep the outer layer of the paper roll 35 constantly central to the apron 39 and to the former 40, substantially as described.

2. The combination of the roller 18, the shaft 65, the carriages 20 and 21, the pinions 25 and 26, and the racks 22 and 23, all operating together to keep the roller 66 or its described equivalent constantly in contact with the adjacent border of the constantly-receding periphery of the roll of paper, all substantially as described.

3. The combination of the shaft 10, the pulleys 29, 30, and 31, the unequal weights 32 and 33, and the strap 34, all operating together substantially as described.

4. The combination of the hollow former 40, having the openings 51 and 52, and the series of openings 54, 55, 56, and 57, and the series of grooves 58 and 59, with mechanism, substantially as described, for drawing air from the interior of that former, all operating together, substantially as described, for the purpose set forth.

5. The combination of the hollow former 40, having one or more openings, 53, with mechanism, substantially as described, for drawing air from the interior of that former, all operating together, substantially as described, to remove the chip made by cutting holes in the paper tube.

WILLIAM A. LORENZ.
WILLIAM H. HONISS.

Witnesses:
ALBERT H. WALKER,
FRANK H. PIERPONT.